United States Patent [19]

Pusateri et al.

[11] Patent Number: 4,458,127
[45] Date of Patent: Jul. 3, 1984

[54] INDUCTOR FOR ANNEALING WORK HARDENED PORTIONS OF STRUCTURAL BEAMS

[75] Inventors: James J. Pusateri, Cleveland; Charles R. Bartlett, Newbury; Paul D. Brazie, West Richfield, all of Ohio

[73] Assignee: Park-Ohio Industries, Inc., Cleveland, Ohio

[21] Appl. No.: 467,242

[22] Filed: Feb. 17, 1983

Related U.S. Application Data

[62] Division of Ser. No. 266,882, May 26, 1981, Pat. No. 4,401,486.

[51] Int. Cl.$^3$ ............................................. H05B 6/04
[52] U.S. Cl. ............................... 219/10.79; 219/10.43; 219/10.57; 219/10.69
[58] Field of Search ................... 219/10.79, 10.43, 8.5, 219/10.57, 10.69, 10.61; 148/146

[56] References Cited

U.S. PATENT DOCUMENTS

| | | | |
|---|---|---|---|
| 2,809,264 | 10/1957 | Van Iperen | 219/10.79 |
| 3,121,780 | 2/1964 | Mucha et al. | 219/10.79 |
| 3,342,970 | 9/1967 | Emeis | 219/10.79 |
| 3,352,724 | 11/1967 | McNitt et al. | 148/144 |
| 3,663,782 | 5/1972 | Emerson | 219/10.69 X |
| 3,705,967 | 12/1972 | Bobart et al. | 219/10.61 X |
| 4,054,770 | 10/1977 | Jackson | 219/10.43 X |

*Primary Examiner*—C. L. Albritton
*Assistant Examiner*—M. M. Lateef
*Attorney, Agent, or Firm*—Body, Vickers & Daniels

[57] ABSTRACT

A method and inductor are provided for annealing the corners of an elongate hollow structural beam in which the corners become work hardened when the beam is produced by cold working initially flat metal plate to the hollow beam configuration. The corners of the beam are inductively heated progressively along the length of the beam in a manner which concentrates heat in the corners and controls the spreading of heat into the sides of the beam from the corners so that the work hardened areas are annealed to provide for the corners and walls to be more uniform in hardness and strength in connection with use of the beam as a structural member. The inductor for so controlling the heating encircles the beam and has arcuate portions each magnetically coupled with a corner of the beam and progressively diverging with respect to the walls of the beam adjacent thereto, and portions between the arcuate portions which overlie the side walls of the beam and are offset radially outwardly with respect to the arcuate portions.

9 Claims, 3 Drawing Figures

INDUCTOR FOR ANNEALING WORK HARDENED PORTIONS OF STRUCTURAL BEAMS

This is a division of application Ser. No. 266,882 filed May 26, 1981 now U.S. Pat. No. 4,401,486.

BACKGROUND OF THE INVENTION

This invention relates to the art of induction heating and, more particularly, to a method and inductor for inductively heating and annealing work hardened portions of a structural beam.

It is well known that structural beam members are often produced by cold forming initially flat metal plate to a desired configuration in which the beam has at least two planar walls with a relatively sharp corner therebetween. One such configuration is a hollow beam which is square in cross-section, and the present invention is described in detail herein in connection with such a beam configuration. However, it will be appreciated that the invention is applicable to other beam configurations.

In cold forming a hollow beam from initially flat sheet metal, the sheet is bent to provide the beam with opposed pairs of planar wall portions having relatively sharp corners between adjacent ones of the wall portions. The longitudinally extending outer side edges of the sheet generally abut centrally of one of the side portions and are welded together to complete the beam. The cold working process results in work hardening of the metal in the corner areas of the beam, whereby the corner areas are much harder than the wall portions of the beam. Therefore, when the beam is loaded, such as in compression for example, the load is primarily borne by the corners of the beam as opposed to being uniformly distributed through the corners and wall portions of the beam. Accordingly, it becomes desirable to reduce the hardness in the corner portions without changing the hardness in the wall portions and so that the corner portions and wall portions are of substantially the same hardness.

SUMMARY OF THE INVENTION

In accordance with the present invention, annealing of the work hardened corner between adjacent wall portions of a cold formed beam of steel plate material is achieved by progressively inductively heating the corner along the length thereof with an inductor and in a manner whereby heat is concentrated in the corner and the spreading of heat into the wall portions adjacent thereto is controlled to optimize achieving a uniform hardness in the corner and walls of the beam. The desired induction heating is achieved with an inductor having a first inductor portion magnetically coupled with the beam corner and progressively diverting with respect to the wall portions adjacent the corner, and second inductor portions extending from the opposite ends of the first portion in radially outwardly offset relationship with respect to the corresponding end. The magnetic coupling of the first inductor portion with the corner provides for heating the hardest portion of the work hardened corner to a desired temperature for annealing, and the diverging of the first inductor portion relative to the wall portions and the radially outward offset relationship of the second inductor portions relative to the first portion provides for progressively reducing the temperature and controlling the spread of heat from the corner into the wall portions. Thus, work hardened areas adjacent the corner but of progressively decreasing hardness relative thereto are heated to reduce the hardness thereof, while areas of the wall portions which are not work hardened by the forming operation are not heated so as to affect the original hardness thereof. In performing the annealing process in connection with a hollow beam, an encircling inductor having such first and second portions assoicated with the corners and walls is supported coaxially with the beam, the inductor is energized across a suitable source of power, and the beam and inductor are axially displaced relative to one another to achieve scanning of the beam along the length thereof and at a scanning rate which provides the desired induction heating of the corner portions of the beam. Preferably, a cooling arrangement is provided behind the inductor with respect to the direction of relative displacement between the inductor and beam, the spacing therebetween being sufficient to prevent quench hardening of the beam material.

It is accordingly an outstanding object of the present invention to provide a method of annealing work hardened corners of elongate cold formed metal beams.

Another object is the provision of a method of inductively heating a work hardened corner between planar wall portions of an elongate cold formed metal beam in a manner which enables reducing the hardness of the metal in the corner portion without changing the hardness of the metal in the wall portions of the beam.

Yet another object is the provision of a method of annealing a work hardened corner along the length of a cold formed metal beam by scanning the corner along the length of the beam with an inductor and in a manner which provides concentrated induction heating of the material in the corner and control of heating of wall portions of the beam adjacent the corner so as to reduce the hardness of the material in the corner without changing the hardness of the material in the wall portions.

A further object is the provision of an inductor for inductively heating and annealing a work hardened corner between planar wall portions of an elongate cold formed metal plate structural beam.

Still a further object is the provision of an inductor of the foregoing character operable to reduce the hardness of the beam material in the corner thereof without changing the hardness of the wall portions of the beam.

Still a further object is the provision of an encircling inductor operable to simultaneously inductively heat and anneal the corners of a hollow cold formed metal plate beam without changing the hardness of the material of the beam in the wall portions between adjacent corners.

BRIEF DESCRIPTION OF THE DRAWINGS

The foregoing objects, and others, will in part be obvious and in part pointed out more fully hereinafter in conjunction with a written description of a preferred embodiment of the invention illustrated in the accompanying drawings in which.

DESCRIPTION OF A PREFERRED EMBODIMENT

Figure 1:
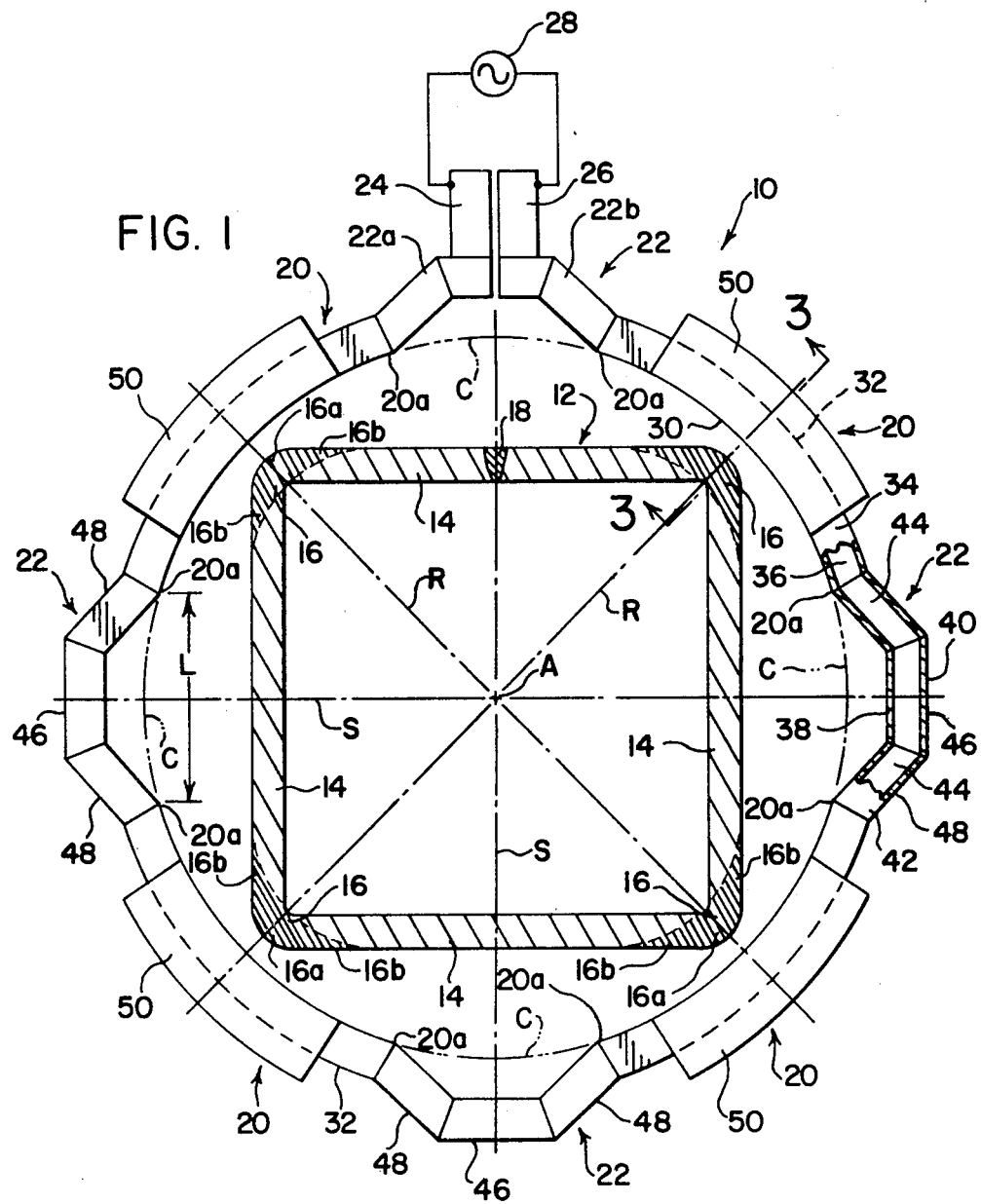
FIG. 1 is an end elevation view showing an inductor constructed in accordance with the present invention in association with a cold formed tubular beam having work hardened corners to be annealed.
Figure 2:
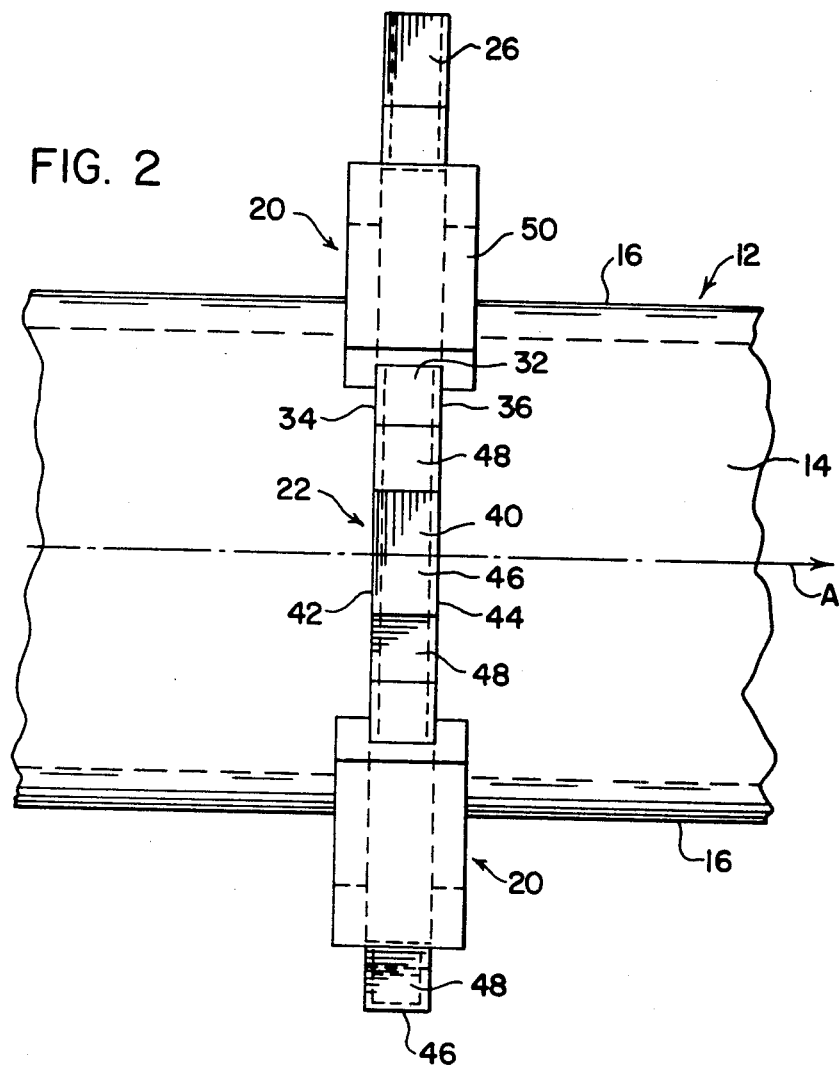
FIG. 2 is a side elevation view of the inductor and beam in FIG. 1.

Referring now in greater detail to the drawing wherein the showings are for the purpose of illustrating a preferred embodiment of the invention only and not for the purpose of limiting the invention, FIGS. 1 and 2 illustrate encircling inductor 10 surrounding a hollow structural beam 12 which is square in cross-section and comprised of planar walls 14 having relatively sharp corners 16 between adjacent ones of the walls. In the embodiment illustrated, beam 12 is formed by cold working a mild carbon steel plate to the configuration shown and joining the initial longitudinally outer side edges of the plate such as by a weldment 18 extending longitudinally along the length of the beam. With further regard to the embodiment illustrated, the plate material has a thickness of about 0.375 inch and the beam has a cross-sectional dimension of six inches transverse to axis A of the beam and measured between the outer surfaces of opposed ones of the walls 14. The beam can of course be of any desired axial length and, for example, may be ten feet long. The cold forming operation by which the beam is produced results in work hardening of the steel material in the areas of corners 16 along the length of the beam, whereby the corners are harder than the walls therebetween.

Inductor 10, when properly associated with beam 12 during an annealing, operation is coaxial with axis A and is comprised of a plurality of arcuate first inductor portions 20 each extending circumferentially of axis A across a corresponding one of the beam corners 16. Each of the inductor portions 20 is of uniform radius between its circumferentially opposite ends 20a with respect to axis A and is circumferentially symmetrical with respect to line R through axis A and bisecting the corresponding beam corner 16. Thus, it will be appreciated that each of the inductor portions 20 progressively diverges with respect to walls 14 on the circumferentially opposite sides of line R of the corresponding corner. Inductor 10 further includes a plurality of second inductor portions 22 each extending circumferentially between an adjacent pair of the first inductor portions 20, and each of the inductor portions 22 is circumferentially symmetrical with respect to a line S through axis A perpendicular to and bisecting the corresponding wall 14 of beam 12. The inductor has opposite ends 24 and 26 adapted to be connected across a suitable source of power 28, and it will be appreciated that the second inductor portion 22 to which ends 24 and 26 are coconected is circumferentially divided to provide separate portions 22a and 22b defining entrance and exit ends for the inductor with respect to the flow of current therethrough.

Figure 3:
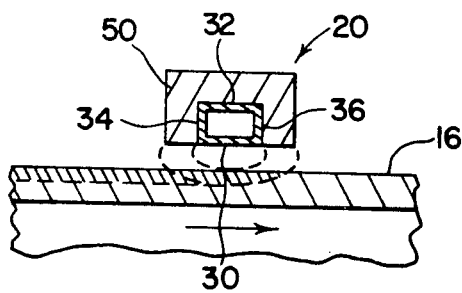
FIG. 3 is a cross-sectional view through the inductor and beam taken along line 3—3 in FIG. 1.

Inductor 10, including end portions 24 and 26, is constructed of tubular conductive material, such as copper, whereby it will be appreciated that ends 24 and 26 are also adapted to be connected to a suitable source of coolant for circulation thereof through the inductor. Preferably, inductor portions 20 and 22 are rectangular in cross-section and have the same cross-sectional dimensions. Furthermore, inductor portions 20 and 22 are coplanar and, in use of the inductor, the plane thereof is perpendicular to axis A. The rectangular configuration of the inductor portions provides for each to have axially extending radially spaced apart inner and outer walls and axially spaced apart radially extending end walls therebetween. As will be appreciated from FIG. 3, this provides for each of the inductor portions 20 to have inner and outer walls 30 and 32, respectively, and axially spaced apart end walls 34 and 36 and, as will be appreciated from FIG. 1, provides for each of the inductor portions 22 to have inner and outer walls 38 and 40, respectively, and axially spaced apart end walls 42 and 44. In the embodiment illustrated, end walls 34, 36, 42 and 44 have a radial dimension of 0.500 inch and walls 30, 32, 38 and 40 have an axial dimensions of 0.750 inch.

As mentioned hereinabove, each of the arcuate inductor portions 20 is of uniform radius of curvature between the circumferentially opposite ends 20a thereof, and in connection with a beam 12 having the dimensions referred to hereinabove, the radius of curvature of inner side wall 30 of each inductor portion 20 is 4.50 inches as measured along the corresponding line R from axis A. This provides for each inductor portion 20 to extend circumferentially across a corresponding beam corner 16 in magnetically coupled relationship therewith when the inductor is energized. Each of the inductor portions 22 extends circumferentially between ends 20a of the adjacent pair of inductor portions 20 and is radially outwardly offset with respect to the radius of curvature of portions 20. In the embodiment illustrated, each of the inductor portions 22 includes an intermediate leg 46 perpendicular to the corresponding line S, and legs 48 at the circumferentially opposite ends of leg 46 and extending at an angle therefrom to end 20a of the adjacent inductor portion 20. In connection with a beam 12 having the dimensions referred to hereinabove, the radial offset as measured along the corresponding line S provides for inner wall 38 of intermediate leg 46 of each inductor portion 22 to be spaced about 0.50 inch radially outwardly from an imaginary line C representing a continuation of the line of curvature of inner walls 30 of the adjacent inductor portions 20. Further, the arcuate extent of inductor portions 20 between opposite ends 20a thereof provides for ends 20a of circumferentially adjacent inductor portions 20 to be linearly spaced apart a distance L between the radially inner edges of ends 20a, and which dimension in connection with the embodiment disclosed is about 2.50 inches. Further in connection with the disclosed embodiment, inner wall 38 of intermediate leg 46 of each inductor portion 22 has a length in the direction of dimension L of about one inch.

In connection with the annealing of the work hardened corners 16 of beam 12 to achieve a uniform hardness of the corners and walls 14 therebetween, it is important to control the heat so as to achieve annealing of the work hardened portions while avoiding overheating of the wall portions which are not work hardened. In this respect, as will be seen from FIG. 1, the work hardening in the corners resulting from the cold forming thereof provides for the material directly in the corner and in the area designated by numeral 16a to be the hardest, and for such hardness to progressively decrease from the corner laterally into the adjacent areas in the sides of the beam as designated by numerals 16b. The original hardness of the sheet metal in the areas laterally inwardly of areas 16b is unchanged by the forming. Therefore, to achieve uniform hardness throughout the cross-section of the beam, it is desirable to optimize concentration of heat in the corner areas 16a, and to control the temperature and spread of heat so as to heat the beam material laterally adjacent the corners in areas 16b to achieve annealing thereof, while minimizing heating of the sides laterally inwardly of areas 16b wherein the beam material is not work hardened.

Controlled heating in the foregoing manner is achieve with inductor 10 as a result of the divergence of inductor portions 20 relative to walls 14 and the radially outward offset relationship between inductor portions 22 and inductor portions 20. In this respect, it will be appreciated that the magnetic coupling of inductor portions 20 with corners 16 provide for the highest temperature of heating to be in areas 16a, that the divergence of inductor portions 20 relative to wall 14 provides for progressively reducing the temperature from portions 16a through portions 16b and into the areas of walls 14 therebeyond, and that the radial outward offset of inductor portions 22 minimizes heating in the central areas of walls 14. In order to optimize achieving uniform hardness thoughout the cross-section of the beam, flux concentrators 50 are provided on inductor portions 20 along a portion of the length thereof and in circumferentially symmetrical relationship with respect to the corresponding line R. Flux concentrators 50 can be constructed from laminations of a suitable magnetic sheet material, or can be formed from a material such as Ferrocon which, as well known in the art, comprises particles of magnetic material in a plastic binder. As is further well known in the art of course, flux concentrators 50 serve to concentrate magnetic flux in a particular area in a workpiece and, accordingly, in connection with the annealing of beam corners in accordance with the present invention concentrate the magnetic flux in the corner portions of the beam. In connection with the inductor and beam as described hereinabove, each flux concentrator 50 has a circumferential length of about three inches.

With respect to annealing the corners of a beam contoured and dimensioned as described herein, using inductor 10, the beam and inductor are coaxially aligned and suitably supported to enable relative axial displacement therebetween during which the inductor is energized for the corners of the beam to be inductively heated during such relative displacement. Satisfactory annealing to obtain a desired uniformity of hardness in the corners and wall portions of the beam is achieved by inductively heating the beam corners to a temperature between 1250° F. to 1350° F. With the inductor herein illustrated and described, such heating and thus the desired annealing of the beam corners is achieved by energizing the inductor across a power source at a level of between about 85 Kw to 100 Kw and relatively axially displacing the beam and inductor at a speed of about 0.5 inch per second. It will be appreciated, of course, that the latter scanning rate can be increased while maintaining heating of the corners to the desired temperature by employing a plurality of inductors coaxially aigned and axially spaced apart with respect to one another. Such a multiple inductor arrangement can also be used to achieve the desired heating of the corners on a beam having a wall thickness greater than that of the beam described herein. In connection with a continuous production operation, for annealing beam corners, it may be desirable to cool the heated beam such as through the use of a quenching ring to facilitate handling the beam following annealing thereof. Such an annealing ring, while not shown in the drawing, would be positioned behind the inductor with respect to the direction of progressive heating of the beam and would be positioned sufficiently behind the inductor to prevent quench hardening of the beam corners. In connection with the scanning rate mentioned hereinabove, for example, the quench ring location would provide for about a forty second delay between a given area being heated and the subsequent quenching of the given area. At the same time, it will be appreciated that the inductively heated beams can be allowed to cool to room temperature following the annealing process without such intentional cooling thereof.

While considerable emphasis has been placed herein on the cross-sectional configuration of the inductor tubing, it will be appreciated that other cross-sectional configurations can be employed, the rectangular tubing being preferred from the standpoint of economy of construction of the inductor. Further, while the arcuate contour of inductor portions 20 and the linear contour of the legs of inductor portions 22 is preferred, it will be appreciated that other contours can be employed for the inductor portions. It is only essential in accordance with the present invention to achieve the desired heating of the beam corners and controlled heating laterally therefrom into the adjacent wall portions that inductor portions 20 extend across the corresponding beam corner so that the center of the inductor portion is close to the outer surface of the corner and the inductor portion extends in circumferentially opposite directions from the corresponding line R in progressively increasing spaced relationship with respect to the outer surface of the beam corner and the adjacent wall portions of the beam, and that inductor portions 22 are offset radially outwardly with respect to the ends of adjacent ones of the inductor portions 20. Furthermore, while specific dimensions have been set forth with respect to the embodiment herein described, it will be appreciated that such dimensions will vary in accordance with variations in the dimensions of the beam. Accordingly, it is to be distinctly understood that the foregoing descriptive matter is to be interpreted merely as illustrative of the present invention and not as a limitation.

Having thus described the invention, it is claimed:

1. A single turn encircling inductor for inductively heating and annealing work hardened corners of an elongate hollow structural beam cold formed to provide opposed pairs of planar walls with said work hardened corners between adjacent ones of said walls, said beam having an axis, said inductor extending circumferentially about said axis and having circumferentially spaced apart first inductor portions each corresponding to a different one of said corners of said beam, each said first portion being radially spaced from said axis a given distance, second inductor portions extending circumferentially between and interconnecting adjacent ones of said first portions, each said second portion overlying a portion of the planar wall of said beam between the corners corresponding to said adjacent ones of said first portions, and each said second portion being offset radially outwardly with respect to said adjacent ones of said first portions.

2. The inductor according to claim 1, wherein said first and second inductor portions are coplanar.

3. The inductor according to claim 1, and flux concentrating means on each of said first portions of said inductor.

4. The inductor according to claim 1, wherein said work hardened corners are in diametrically opposed pairs with respect to said beam axis, said first inductor portions being in diametrically opposed pairs each symmetrical with respect to a line through said beam axis and bisecting the corresponding opposed corners, and said second inductor portions being in diametrically opposed pairs each symmetrical with respect to a line through said beam axis and perpendicular to the corresponding opposed beam walls.

5. The inductor according to claim 4, wherein said first beam portions are arcuate and of uniform radius with respect to said inductor axis.

6. The inductor according to claim 4, and flux concentrating means on each of said first portions of said inductor.

7. The inductor according to claim 4, wherein said first and second inductor portions are coplanar.

8. The inductor according to claim 7, wherein said first beam portions are arcuate and of uniform radius with respect to said inductor axis.

9. The inductor according to claim 8, and flux concentrating means on each of said first portions of said inductor.

* * * * *